United States Patent Office 3,411,972
Patented Nov. 19, 1968

---

3,411,972
METHOD FOR MOLDING GELATIN PRODUCTS
Ival O. Salyer and James L. Schwendeman, Dayton, Ohio, assignors to Monsanto Research Corporation, St. Louis, Mo., a corporation of Delaware
No Drawing. Continuation-in-part of application Ser. No. 296,450, July 22, 1963. This application June 30, 1966, Ser. No. 561,754
3 Claims. (Cl. 156—336)

ABSTRACT OF THE DISCLOSURE

Chemically unreacted gelatin having a water content of from 12 to 14 weight percent is molded at 100°–160° C./50–3,000 p.s.i. to obtain a very tough solid. Laminates are prepared by first impregnating a permeable support with an aqueous solution of gelatin and drying to give a coating of gelatin having the above water content, stacking, and molding the stack under the above conditions of temperature and pressure.

---

This application is a continuation-in-part of our applications Ser. Nos. 296,450 and 296,480, both filed on July 22, 1963, and both now abandoned.

The invention relates to strong, molded bodies and more particularly to materials of construction comprising gelatin and to the method of producing the same.

Although gelatin has been widely employed industrially, e.g., for the preparation of medicinal capsules, photographic films, and adhesives, its sensitivity to heat and moisture and the brittle nature of the unplasticized, solid gelatin have hampered its application as a material of construction. Also, although resistance to heat and moisture is improved by tanning it, i.e., by reacting the gelatin with tannic acid or the natural tannins, or with chromium salts, or with phenolic and/or aldehydic compounds, the thus chemically modified gelatin usually is a horny material which, owing to its complex composition, is not suitable for producing units of uniform shape and structure. Gelatin, itself, varies in composition with its method of production and when it is reacted with such active monomeric compounds as, say, formaldehyde, tannic acid, pyrogallol, chromic acid or the salts thereof, a variety of reaction products are formed owing to condensation at some or all of the functional groups present in gelatin, and/or fragmentation and/or convolution of the gelatin chain. Usually addition of the active compound to an aqueous solution of gelatin causes almost immediate gelation, thereby preventing proper impregnation in laminate structure; and drying of the gels gives a product of insufficient flow for technically feasible molding operations.

Gelatin is known to be denatured by heating; therefore, prior attempts to mold gelatin have involved compacting gelatin at ordinary atmosphere temperature. Obviously, when finely comminuted, solid gelatin is mixed with sufficient water to cause stickiness of the gelatin, the particles will adhere to each other. The resulting mass can then be dried to, say, a slab. However, here again uniformity of product is not achieved because the water has penetrated into some of the particles to a greater extent than into others and there is obtained a multiphase structure. On the other hand, when the gelatin particles are not made sticky before compacting, extreme pressures, e.g., pressures of 20,000 p.s.i. and more, are required to cause coherence. Molded products thus obtained present a coarse surface due to insufficient flow of the gelatin; they possess poor mechanical strength, and are soluble in water to about the same extent as the unmolded particles. In order to obtain smooth pieces, it is necessary to treat them carefully with wet steam for obtaining just enough solubilization of the surface to provide, upon drying, a hardened gel as a coating. Hence, molding at ordinary atmospheric temperatures at very high pressures does not provide a commercially feasible means of converting gelatin to structural units. Not only is the extreme pressure impracticable; but, also consisting shaping to dimensional tolerance is problematic and steaming of rough surfaces to make them smooth requires mechanical provision for coping with stickiness. Also, when a moisture-resistant material is desired, use of extreme pressures at ordinary atmospheric temperature is futile, since the compressed gelatin thereby obtained is as water-susceptible as the starting material.

Although chemically unmodified gelatin is known to be degraded upon heating, we have found that very useful structural materials are obtainable by employing discrete solid, finely comminuted gelatin containing from 12% to 40% by weight of water and molding it at from about 100° C. to about 160° C. at a moderate pressure of, say, from about 50 p.s.i. to about 3000 p.s.i. and preferably at from about 500 p.s.i. to about 1000 p.s.i.

The manner in which water is retained in solid gelatin is not definitely known. Hydrogen bonding may be present or there may exist merely a solute/solvent relationship. However, it is not believed that the gelatin is chemically modified by its water content, i.e., it does not appear that a molecule of water has reacted chemically with one or more of the functional groups present in gelatin. Hence, as used herein, the term "chemically unmodified gelatin" includes moisture-containing gelatin; it does not include gelatin which has been modified by treatment with an agent that reacts chemically with a functional group present in gelatin.

The moisture content of commercial gelatin in solid form may vary widely, depending upon the method of manufacture, temperature and extent of drying, storage conditions, etc. However, the moisture content equilibrates very rapidly with the environment. Hence, irrespective of its water content as received, when gelatin is stored at ordinarily encountered relative humidity, a moisture content which is within the at least 12% limitation is easily arrived at. For example, a moisture content of about 13% is achieved by conditioning gelatin at 25° C. and 40% relative humidity until cessation of change in weight. Such equilibration is generally effected within 24 hours. Hence the present process generally presents no problem of moisture control, insofar as most commercially available gelatin is concerned. Even though gelatin has been dried, during manufacture, to significantly lower moisture content, during usual conditions of transportation and storage it will absorb moisture which is at least 12% by weight of the solid gelatin, since a relative humidity of less than, say, 35% is rarely encountered. The maximum content of moisture which may be present in the gelatin is limited only by the fact that the gelatin to be moulded must be in the solid state to permit molding under heat and pressure. As will be realized by those skilled in the art, proper forming requires that the molding mix be retained in the mold, i.e., flow must be limited to within the mold. We have found that comminuted films of gelatin, cast from water solutions thereof and dried only to remove surface wetness to the extent that fragmentation into discrete particles is permitted, is a suitable charge for the mold. We have found that gelatin which has been stored to constant weight at 100% relative humidity and thus containing about 30% of water can be molded under heat and pressure to give solid, molded articles. The rate and extent of flow of moisture-containing gelatin is a function of not only the moisture content of the gelatin but also of the molding technique. As the moisture content of gelatin in solid form is increased, the gelatin has an increasingly greater flow when subjected to heat and pressure. Injection molding requires higher flow than does compression molding. Hence, a solid gelatin which is most suitable for injection molding will generally contain more moisture than that which is most suitable for compression molding, e.g., it may contain from 25% to 35% by weight of water. Generally, the maximum moisture content of the solid gelatin which is to molded is about 40% by weight of the gelatin. For compression molding at the usual operating pressures, a moisture content of say 13% to 16% will be found most useful at pressures of, say from 50 to 800 p.s.i. Whether or not the flow is suited to the molding technique is readily determined by the molding operator through simple observation. In molding solid gelatin, the moisture content of gelatin is simply adjusted to the desired extent of flow. For example, if the flow is to high for the contemplated molding technique, the gelatin contains more moisture than is required for satisfactory use of said technique. Accordingly, the gelatin is conditioned and made more suitable by storing it at a lower relative humidity which permits equilibration of the moisture content to a lower and more suitable level. Thus, a solid gelatin which has been stored to constant weight at 75% relative humidity and contains about 23% of moisture may be unsuitable for a compression molding process involving immediate application of very high pressure. Such gelatin can then be stored to constant weight at a lower relative humidity, say, at 50% relative humidity, and then tested in the proposed molding technique. Determination of suitability of the gelatin and conditioning thereof by adding or subtracting the moisture content is thus simply a matter of routine testing, and requires no more of it than does the adjusting of the concentration to molding technique of such common components of molding mixes as dyes, fillers, plasticizers, etc.

The molding process may be carried out with any conventional compression and injection molding procedures, and the gelatin may be in powdered, granulated or in flake form. Segmented film gelatin may be used. Aside from the required moisture content no particular precautions with respect to the gelatin need be observed, i.e., the gelatin may be an acid or alkali process gelatin, a bone gelatin or a hide gelatin, and it may or may not contain the small amounts of impurities which are customarily encountered in technical grades of gelatin. The usual food grade or technical grade of gelatin has a pH which is substantially neutral, i.e., it will vary between pH 5 to pH 7. Acid process gelatin of commerce usually has a pH of about 5. Although the effect of pH on moldability is minor, we have found that significant effect exists upon the molded products. Too low a pH gives a rubber product; too high a pH results in loss of mechanical strength properties. Thus a rubber-like molding was obtained from a gelatin to which pH 4 had been imparted by casting it from an aqueous solution containing hydrochloric acid; and whereis a gelatin molded from a resin having a pH of 5–7 will generally have a flexural strength of about 70,000 p.s.i., that obtained from a resin having a pH of 8 will generally have a flexural strength of about 25,000. To obtain tough, non-rubbery, solid, molded pieces of high mechanical strength it is advantageous to use a gelatin which has a pH of from 5 to 7. Since the usual gelatin of commerce has a pH within this range, here again, generally no specific precautions in this respect need be observed. Irrespective of the process by which the gelatin was prepared and the source from which it was derived and the Bloom strength and viscosity of the aqueous solutions from which it was cast into films or flaked, shaped articles of substantially the same order of mechanical strength are obtained upon compression and injection molding so long as the moisture content of the starting gelatins and the pH thereof are substantially of the same order and the molding procedures and conditions are not too diverse.

That the source and method of manufacture of the starting gelatin has substantially on effect on the nature of products obtained therefrom under heat and pressure is surprising, for in prior applications such factors were almost universally believed to be controlling. Their relative unimportance insofar as the present utility is concerned may be attributed to changes in the gelatin brought about by heat and pressure which make for uniformity of the finished product irrespective of variation in starting material. It has long been known that gelatin is changed in some manner upon application of heat. In the present process, the inherent properties of gelatin are radically modified by simultaneously applied heat and pressure, and the effects are demonstrated stepwise. Thus, while mere heating at temperatures of, say, from 80° C. to below 100° C. of a gelatin containing at least 12% moisture serves only to weaken the gelatin, heating at higher temperature with simultaneous application of pressure causes the gelatin to recover its strength and changes it in such a manner that high strength is retained at temperatures which are very much higher than those employed in the pressure molding. For example, gelatin having a water-content of about 13.5% has a minimum in the modulus of elasticity curve at 110° C. But by heating it at, say, from 125° C. to 150° C. with simultaneous application of pressure, it is converted into a molded solid having a much higher modulus of elasticity, i.e., it recovers its strength. That a chemical change has occurred is evidenced not only by increased heat resistance and mechanical strength but by a difference in the effect of water. Instead of being dissolved by immersion into water, when temperatures of at least 125° C. are used in preparing the presently provided molded gelatin, either during molding or subsequent thereto, the products are only swollen by water, and only swelling is evidenced even when they have been kept in boiling water for an hour. Also, although gelatin readily absorbs atmospheric moisture, after molding under pressure at a temperature of at least 125° C., or by heating at such temperatures molded products obtained at 100° C. to less than 125° C., the resulting molded gelatin is rendered impervious to such moisture, i.e., there is little or no pick-up of atmospheric moisture.

Accordingly, by the present process there is provided not only a means of manufacturing shaped objects from an inexpensive, readily available starting material, but also a unique material of construction. Those of the molded objects which have been made at from 100° C. to less than 125° C. and are still water-soluble are edible. The gelatin is treated, according to the invention, simply with heat and pressure; hence it contains no contaminants which would make it unsuitable for food. For that reason it is particularly of interest as an edible construction material which is suitable for use within a space vehicle, wherein articles constructed thereof and not indispensable for continued travel of the vehicle are available as emergency rations. Also extra supplied and scientific equipment for previously landed astronauts can be deployed to them in unmanned logistic vehicles having molded gelatin components and carrying supplies in containers molded from gelatin. Said components and containers could then serve for food. Other nutrients may be added to the gelatin previous to molding in order to enhance the food value of vehicles and containers made therefrom, e.g., there may be incorporated sugars, starches, casein, etc., either as fillers or, in fiber or textile form as reinforcing components of plies in laminate structures.

Those of the presently provided molded materials which are water-insoluble and impervious to atmospheric temperature, i.e., those in which a temperature of at least 125° C. has been employed either in the molding cycle or subsequent to molding, are high strength materials of construction which are generally suitable for applications which do not involve extreme exposure to water. Such products are swollen by cold water only after immersion therein for several days and they are substantially impermeable to atmospheric humidity. Boiling water does not dissolve them although after about one hour they become distorted by swelling. Hence in fields requiring high tensile strength and involving substantially no immersion in water at increased temperatures, the molded gelatin is a highly desirable material of construction. The present products possess extremely good resistance to torsion even at temperatures of over 200° C. and possess a very high modulus of elasticity at ordinary temperatures. They are readily obtained from an easily available starting material and the procedure for fabricating them entails neither special equipment nor operating conditions which are outside the usual practice employed in present-day molding techniques.

The very good mechanical strength of products obtained from gelatin containing from 12% to 40% of moisture and compression molded at from 100° C. to 160° C. at from 50 to 3000 p.s.i. of pressure, can be increased by employing the gelatin with reinforcing agents in the preparation of composites, including laminates. Thus, in the manufacture of laminates, a composite structure is formed of alternate layers of a permeable fabric and solid gelatin containing at least 12% of moisture, and the lay-up pressed directly, since gelatin flow during pressing enables penetration of the gelatin within interstices of the fabric. The gelatin may also be applied to the textile by casting on the surface of the fabric a gelatin film from a solution of gelatin which may be in water, or any other solvent of gelatin which is readily volatilizable. Such solvents may also be used when application of the gelatin is by impregnation, though for purposes of economy water is preferred since use of the more expensive solvents does not appear to enhance any properties of the finished laminate.

Conveniently, preimpregnated stock may be formed. Such stock, commonly referred to as "pre-preg" is supplied by manufacturers of a number of prior art resin-impregnated glass cloth. The impregnated cloth is delivered in dry form, ready for cutting and laying up by the laminator. Wide use of pre-pregs has been somewhat limited owing to limited shelf life of those products which require incorporation of accelerators into the resin, and air-entrappment during pre-preg preparation. Such obstacles are not encountered with gelatin, since setting of gelatin during molding requires no additive and impregnation of the textile from aqueous solution is easily accomplished without bubble formation. Because moisture content of the gelatin is particularly important in the present process, use of pre-pregs provides a ready means of moisture control. The pre-pregs are simply stored at the constant humidity which is known to result in equilibration of moisture to the desired level.

Irrespective of whether the gelatin is present in the composite as impregnant of the textile or in layers alternating with the textile, for preparation of rigid, well-bonded laminates the gelatin should be present in the composite in a quantity which is at least 10% by weight of the lay-up. When present as impregnant, the required quantity is readily attained by employing solutions of gelatin that contain a concentration of gelatin which, upon drying to at least a 12% moisture content based on the weight of the gelatin, will give the required gelatin content in the textile. Generally, aqueous solutions having a 20% to 40% concentration of gelatin are satisfactory for this purpose when impregnation is conducted by dipping or passing the sheet of textile into or through the gelatin solution. As will be appreciated by those skilled in the art, the useful concentration of the solution will depend upon the number of treatments. Less concentrated solutions may be used when repeated immersion, followed each time by drying, is used than when a one-step operation is employed.

The maximum quantity of gelatin which may be used with the supporting layer to form a laminate will depend upon the toughness and rigidity desired in the laminate. So far as moldability is concerned, an infinite proportion of gelatin to a permeable support, e.g., glass cloth presents no problem. However, to obtain rigid laminates of exceptional mechanical properties, a limitation on gelatin maximum in the order of, say, 60% by weight on an anhydrous basis, based on the total weight of the assembled composite, makes for expedient operation because there is a lower limit of reinforcing support which must be present to give strength which is greater than that of the molded gelatin per se. Also, when the support is a textile, e.g., glass cloth, impregnation with greater quantities of gelatin is difficult and the use of powdered gelatin or of gelatin films in alternating layers requires a layer thickness of gelatin which is thin enough to permit uniform penetration of the textile layer. The recommended quantity of gelatin, based on the total weight of the assembled composite is thus from 10% to 60%, and preferably from 15% to 50% by weight, on an anhydrous basis.

To summarize: conditions for fabricating laminates by the impregnation procedure comprise impregnating a sheet of a permeable support such as a glass fiber textile with an aqueous solution of gelatin to give an impregnated ply having a content of gelatin containing from 12% to 40% of water which content is from 10% to 60% on an anhydrous basis of the weight of the impregnated ply, super-imposing a plurality of the impregnated sheets on top of each other to form a composite, and molding said composite at a temperature of from 100° C. to 200° C., and a molding pressure of 50 to 1500 p.s.i. To obtain increased water-resistance, molding is conducted at a temperature which is from 125° C. to 160° C. and preferably of from 130° C. to 140° C.; or, if molding is conducted at below 125° C., curing at 125° C.–160° C. subsequent to molding should be employed. The desired moisture content of the gelatin in the impregnated textile can be readily attained by conditioning, i.e., maintaining the impregnated ply at constant humidity until equilibration. In practice, the impregnated ply is air-dried and then stored to constant weight under conditions of known relative humidity. Substantially the same heat and pressure conditions are used in the fabrication of filament wound composites formed of gelatin-coated fibrous materials, e.g., glass.

The presently preferred support is glass fiber or textiles thereof. Glass fiber reinforced laminates are generally known in the art, and glass fiber textiles for use in the preparation of said laminates are readily obtainable. Although generally such textiles are commercially provided with finishes which are designed to facilitate impregnation by bonding resins and molding of composites from the impregnated textile, whether or not the fabric is finished or the nature of the finish if one is present does not matter in the present instance, since the cloth is readily coated and impregnated with the gelatin by immersion in an aqueous solution thereof, adherence of the coating and of the deposits to the glass fibers requires no primer or retentive layer, and the necessity for uniform dispersion of catalyst or promoter is not required since the molding occurs in absence of such adjuvants. Generally, in the manufacture of glass fiber cloth, binders are used to cohere the filaments into workable strands and to act as lubricants during weaving of the textiles. Such binders may or may not be removed previous to using the glass fiber textile as laminate, because usually the presence of the binder does not affect lamination with gelatin. However, when working with glass cloth which has not been previously tested with gelatin, it is recommended that tests be made with and without removal of the binder previous to molding in order to ascertain the effect of the binder in preparing the gelatin laminate. Removal of most binders can be accomplished simply by heat-cleaning. Although the use of synthetic resins, rather than gelatin, frequently requires that the heat treatment be followed by application to the textile of a material which will serve to bind the resin to the glass fibers, in the present instance no such step is required. Gelatin containing at least 12% of water has been found by us to form an excellent bond with said fibers without the use of an extraneous bonding agent.

The weave of the fiber glass cloth is also generally immaterial in the production of the present laminates. There may be employed plain square woven cloth, crowfoot satin, eight harness satin, unidirectional satin, etc. Many varieties of glass fiber textiles are available and, as will be evident to those skilled in the art, the fabricator has a choice of that type which best meets his requirement with respect to weight, strength and cost. Generally, thickness of the fabric is proportionate to the impact strength thereof, and the tensile and flexural strength will be governed by fiber diameter and structure. Hence in order to provide meaningful data, in the examples which follow the same glass cloth has been used. It is known in the art as IP 181, and is available from numerous sources which supply materials for fabrication of fiber glass reinforced laminates. The specification of said IP 181 glass cloth are as follows:

Thickness _____ inches__ .0085
Weight/sq. yard _____ ounces__ 8.90
Thread count _____ 57 (warp) x 54 (fill)
Tensile strength: [1]
    Warp _____ pounds/inch__ 340
    Fill _____ do____ 330
Yarn:
    Warp _____ 225⅓
    Fill _____ 225⅓
    Weave _____ H satin__ 8

[1] ASTM method 579-49.

However, since, as pointed out above, the nature of the glass cloth is not critical in the production of the present laminates, the cloth employed with gelatin containing at least 12% moisture according to the process of this invention will be hereinafter referred to, in the specification and claims, simply as glass fiber textile.

Laminate structures are similarly prepared employing, at the suppotring layer or substrate, a permeable or non-permeable sheeting of cellulosic, metal, or plastic material, e.g., cotton canvas, nylon cloth, silk or wool cloth, ethylene polyterephthalate film, copper sheeting, stainless steel screening, silica fiber cloth, boron fiber cloth, etc. The gelatin may be applied in solid, particulated form or in solution to any desired support, dried upon the support to the required degree of moisture and then subjected to heating at 100° to 160° C. at a pressure of 50 to 3000 p.s.i., depending upon the desired degree of water-resistance, very high tensile strength being obtained within these entire temperature and pressure ranges.

Composites are also readily prepared by filament winding. For example, glass fiber is passed through a gelatin-water bath and the resulting gelatin-coated fiber is conditioned to an at least 12% moisture content and subsequently wound onto a mandrel under tension and heated to fuse together. Alternatively, glass fiber issuing from the gelatin-water bath can be wound directly onto a mandrel and then dried to proper moisture content and compression molded.

In either the fabrication of tough, hard, shaped objects of gelatin or in the manufacture of laminates, the gelatin may be admixed with fillers, dyes, pigments and plasticizers previous to molding. Usually, organic fillers such as wood flour, microballoons of urea-formaldehyde resin, etc., do not contribute to water-resistance and often detract from mechanical properties. Inorganic fillers such as mica, carbon black and graphite are useful when it is desired to introduce electrically-conducting and/or visco-elastic damping properties into the products. Other inorganic fillers which may be employed are, e.g., titanium dioxide, colloidal silica, clay, aluminum silicate, etc. Also advantageously incorporated into the laminate with the gelatin binder are biological toxicants, e.g., germicides or fungicides for the purpose of inhibiting possible biological attack of the molded products. When the molded gelatin is designed to possess the dual purpose of serving as structural material and as food, nutrient supplements, e.g., starches, sugars, proteinaceous materials, vitamins and minerals may be incorporated as fillers, with molding being conducted at 100° C. to below 125° C. in order to otbain a water-soluble, and hence digestible material of construction. Also, in laminate fabrication, the supporting layer may consist of, or provide a nutrient. For example, the supporting member may be a screen or textile or panel of a material such as zein, gluten, or keratin fiber, spun or caramelized sugar, etc.

Because of the very high flexural strength which is obtained by molding the moisture-containing gelatin, alone, according to the present process, use of structurally weak substrate will generally give molded products that possess less mechanical strength than those obtained in absence of the substrate. A like observation can be made with respect to the use of materials which are known to plasticize gelatin films or capsules, e.g., glycerine, ethylene glycol, sorbitol, etc. Such materials serve to give molded products which are soft and rubbery rather than hard and tough; moreover, they tend to add to the water-susceptibility rather than to decrease it; and heat-resistance is generally lowered owing to easy volutilization of the plasticizer.

The gelatin may also be admixed with polymeric compounds, generally. When thus employed, the added polymer usually acts merely as a filler; and, in such cases, the properties of the molded gelatin may be impaired in proportion to its content of water-soluble polymer. Thus the very good tensile strength at high temperature of gelatin molded according to the present process, is somewhat decreased by admixing it with polyvinyl alcohol, even though hydroxy compounds, e.g., pyrocatechol or β-naphthol are known to harden a gelatin by chemical modification, and glycerin is a very good plasticizing agent for gelatin castings. Mixing gelatin with a polyisocyanate (polyurethane prepolymer) gives products which are substantially like those prepared in absence of the gelatin, even though cross-linking with the gelatin to a polyurethane-type structure may have occurred during the compression molding. Polyacrylic acid may be added to aqueous solutions of gelatin to give clear solutions which are useful impregnating agents, since mixing of this polymer with the gelatin solution does not result in gelling. The polyacrylic acid may be used with the gelatin in any proportion; however, in order to obtain optimum flexural strength, the gelatin should be present in predominant proportion. A quantity of the polyacrylic acid which is 20% or less, based on the weight of the gelatin, is preferred. At a gelatin polyacrylic acid weight ratio of about from 1:0.2 to 1:0.01, the flexural strength of molded products, including composites, remains at about the same order as that obtained with gelatin, alone; however, the moisture resistance of those of the products which are obtained with the gelatin/polyacrylic acid mixtures is somewhat better, particularly with respect to the effect of boiling hot water. Although increased stability upon boiling indicates cross-linking of the gelatin, the use of high proportions of polyacrylic acid in order to improve resistance to boiling is not recommended because with increase of polyacrylic acid the very good mechanical strength of gelatin is impaired. For fabrication of structural components such sacrifice of mechanical strength is not warranted, because need for immersion of the components in boiling hot water over any significant length of time is rarely encountered.

Use, with gelatin of small quantities of organic polymeric materials having functional groups which react with gelatin for the purpose of introducing some cross-linking generally does not adversely affect the molding properties of the gelatin, probably because the hardening effect produced by reaction with a long-chained polymeric material is neither so abrupt nor so extreme as that produced by a monomeric material having functional groups which are known to react with gelatin. Also, it may be that the back-bone chain of the polymer, serving as a plasticizer, tends to compensate for the rigidizing effect of cross-linking. Likewise, the ordered arrangement of functional groups, e.g., the carboxylic radicals of polyacrylic acid, prevents the erratic attack at diverse sites of the gelatin structure which is so often demonstrated in the mixture of reaction products obtained by reacting gelatin with a monomeric material such as formaldehyde and other hardening or tanning agents for gelatin. However, in choosing a polymeric compound for mixing with the gelatin, care must be observed in order to avoid the possibility of substracting from, rather than adding to, the favorable characteristics of gelatin, alone. Thus for example, when heat stability is desired, the polymeric additive should be one which is not readily degraded, because thereby any unreacted quantity of additive would weaken the whole upon exposure to temperatures which are above the decomposition point of the unreacted material. This is well exemplified in the case of starch dialdehyde. Thus, when a laminate obtained from glass fiber textile and a 70:30 weight ratio mixture of gelatin and starch dialdehyde is heated to 125° C., there results not only some loss in strength, but also thermal degradation as indicated by blackening. However, these phenomena are not observed with a 90:10 gelatin/starch dialdehyde ratio. Inclusion of larger quantities of carbohydrate material is possible without detriment to the molded product when molding is conducted at the lower extreme of the presently useful 100° C. to 160° C. temperature range, e.g., at below 125° C. In such a case, the products have the very good mechanical strength of those obtained by molding at from 125° C. to 160° C., but they do not possess the very good heat stability and the degree of moisture-resistance obtained by molding gelatin containing from 12% to 40% moisture at a temperature of above 125° C.

Irrespective of whether the gelatin is used with additives such as fillers, dyes, pigments, plasticizers, or polymeric functionally reacting materials, the gelatin must contain moisture within the 12% to 40% by weight limits. The additive generally does not contribute to the flow of gelatin under the molding compositions; hence provision for proper flow should be made without any reliance on the additive for achieving this characteristic. Although this invention embraces the use of inert additives and of polyfunctional polymeric materials with the gelatin, the invention is primarily concerned with obtaining strong, shaped solid molded objects from gelatin, the noteworthy feature being the molding of chemically unreacted gelatin containing the herein specified amount of moisture at from 100° C. to 160° C. at from 50 to 2000 p.s.i. to obtain strong shaped solid objects, those of the products which have been molded at above 125° C. being less susceptible to water than those obtained at below 125° C.

The invention is further illustrated, but not limited by the following examples.

EXAMPLE 1

2.5″ x 0.285″ x 0.085″ test specimen was molded in a 30 ton Elm's press from granulated gelatin containing about 13% of water by bringing the mold pressure of 800 p.s.i. immediately after loading the press, turning the steam valve to 28 p.s.i. and holding for 5 minutes after the platen temperature begins to exceed 126° C. At the end of that time the stream was discontinued, water-cooling was used to reduce the temperature to 40° C., and pressure was then relieved. Employing ASTM procedure D–1043–61T the following values were obtained for the modulus of elasticity.

| Temp., ° C.: | P.s.i. |
| --- | --- |
| 25 | 1,050,000 |
| 50 | 1,050,000 |
| 75 | 1,050,000 |
| 90 | 1,050,000 |
| 100 | 800,000 |
| 135 | 520,000 |
| 150 | 245,000 |
| 165 | 85,000 |
| 200 | 45,000 |

The test specimen was not affected by immersion in cold water for 24 hours, and swelling was not evidenced until after immersion for several days. It was swollen, but not dissolved, by hot water, the rate of swelling being a function of the temperature; thus in boiling water it began to swell after an hour.

In another experiment, gelatin containing about 13% of water was powdered and dried in a vacuum oven at 60° C. to 70° C. for several days until the weight had been reduced from 42.1 g. to 37.9 g. This loss represented a reduction of water to about a 3% by weight content. Attempts to mold this dried gelatin by the same molding technique were unsuccessful.

EXAMPLE 2

A film which had been cast from an aqueous solution of gelatin was broken into fragments, but not granulated or powdered. Molding of the fragmented gelatin using the procedure of Example 1 gave a smooth, bubble-free, test bar having a modulus of elasticity of 740,000 p.s.i. at 25° C., of 240,000 p.s.i. at 160° C., and of 2000 p.s.i. at 226.5° C., as determined by ASTM procedure D1043–61T.

The difference in the modulus of elasticity values from those of the Example 1 test specimen may be due to the difference in the particle size of the gelatin as well as to the fact that the gelatin of Example 1 had been conditioned to 13% relative humidity whereas in the present example the gelatin had a higher moisure content.

EXAMPLE 3

A plate and frame mold was loaded to heaping with sufficient powdered gelatin of about 13% moisture content to fill it. It was pressed down at 500 p.s.i. hydraulic pressure (800 p.s.i. mold pressure) and tamped by repeated application and release of pressure. The mold was then opened again, filled to heaping, placed in the press, and closed with 500 p.s.i. hydraulic pressure (800 p.s.i. mold pressure). Molding was conducted at a maximum of 130° C. and 500 p.s.i. hydraulic pressure for 1 hour. Pressure was released after cooling. A clear, solid 5″ x 5″ x 0.5″ molding of very good mechanical properties was thus obtained. It was not at all affected by immersion in cold water for one hour and was swollen, but not dissolved, by boiling water within the same period.

EXAMPLE 4

Powdered gelatin containing about 13% of moisture was molded into 3.5″ x 3.5″ x 0.125″ pieces as follows: The press was loaded with powder, the hydraulic pressure was brought immediately to 500 p.s.i. (800 p.s.i. mold pressure), and the steam valve was turned to 28 p.s.i. After the platen temperature had reached 126° C., it was held there for 5 minutes, and steam was then discontinued. Upon water-cooling to 40° C. and releiving pressure, the press was opened. The molded pieces were easily removed. They were free of bubbles, smooth and glossy and cleanly edged.

EXAMPLE 5

Two sets of flexural test bars were molded by the procedure of Example 1 from the following formulations:

(A) 15 g. gelatin and 30 g. wood flour
(B) 45 g. gelatin and 30 g. wood flour

Prior to mixing the gelatin with the wood flour, the gelatin had been granulated and stored to constant weight at 40% relative humidity. Mixing was effected simply by thorough stirring. Testing of the molded specimens showed that increasing the wood flour content resulted in decreased strength. Thus, the molded specimen from (A) had a flexural strength of 10,981 p.s.i. at failure with an 0.06 inch deflection, and the molded specimen from (B) had 7,511 p.s.i. at failure and an .05″ deflection.

EXAMPLE 6

A mixture consisting of equal parts by weight of polyvinyl alcohol and of gelatin containing 13% of water was placed into a frame mold, the press was closed at 100 p.s.i. and hydraulic pressure then was increased to 500 p.s.i. This pressure was maintained for 5 minutes at 126° C. to 130° C., followed by cooling under pressure for 10 minutes. Testing of the resulting clear, pale yellow molded piece by ASTM procedure D–1043–61T gave the following values for the modulus of elasticity.

| Temp., ° C.: | P.s.i. |
|---|---|
| 25 | 500,000 |
| 50 | 230,000 |
| 75 | 54,000 |
| 100 | 23,000 |
| 125 | 15,000 |
| 150 | 9,200 |
| 175 | 7,200 |
| 200 | 5,800 |
| 225 | 2,400 |

It will be noted that the molded gelatin of Example 1 had a modulus of elasticity of 340,000 p.s.i. at 88° C. and of 160,000 p.s.i. at 190° C. Hence, the presence of polyvinyl alcohol in the mix reduces the high strength of gelatin at high temperatures.

EXAMPLE 7

Gelatin which had been equilibrated to 13% moisture was ground to a powder and compression molded into a test specimen at 150 to 500 p.s.i. of hydraulic pressure, increasing the temperature from 22° C. to 124° C. during about 15 minutes and then holding at 124° C. for 5 minutes. The press was opened when the temperature had dropped to 50° C. Testing of the easily removed, well-dimensioned specimen by ASTM procedure D–1043–61T gave values which showed changes in the specimen to be occurring as a result of the heating which the evaluation required. Thus, the following values were obtained for the modulus of elasticity:

| Temp., ° C.: | P.s.i. |
|---|---|
| 60 | 430,000 |
| 70 | 140,000 |
| 130 | 2,000 |
| 168 | 76,000 |
| 216 | 2,000 |

After the specimen had been evaluated, it was found to be unaffected by immersion in cold water for one hour and was only swollen, rather than dissolved by immersion in hot (80° C.) water or by boiling in hot water for 1 hour.

In another experiment, gelatin having the same moisture content was molded into test specimens using the 124° C. maximum temperature, and the other molding conditions described above to give a test specimen for water-resistance tests, rather than for flexural testing, since the latter evaluation required heating at temperatures of above the molding temperature. One of the specimens thus obtained was found to be swollen by cold water and dissolved by very hot (80° C.) water. Another of the test specimens was heated at a temperature of 130° C. for about five minutes and then tested for water resistance. It was found to behave like the specimen which had been heated to 216° C. for the flexural tests, i.e., it was unaffected by immersion in cold water for a short time and swelled in cold water only after several days of immersion, and it was only swollen upon boiling in water for 1 hour.

From the above, it is evident that the gelatin molded at below 125° C. reaches a minimum modulus and then recovers its elasticity as heating is continued. This phenomenon probably results from a cross-linking of the gelatin molecule through free carboxy and amino groups which is induced by heating above the temperature at which minimum elasticity is encountered. The phenomenon is irreversible, for molded gelatin products which have been heated above the temperature of its first minimum modulus and then regain elasticity demonstrate remarkable resistance to water.

EXAMPLE 8

Gelatin in the form of flakes and in about ¼″ x ¼″ x ⅛″ pieces was conditioned overnight at 100% relative humidity to obtain a moisture concentration of 29% by weight. The cylinder of a 1-ounce injection molding machine was loaded and tamped down with the conditioned gelatin, without further comminuting it, and the gelatin was molded into test bars for flexural and tensil strength tests. Ram pressure used was 900 p.s.i., the cylinder temperature was 130° C. and the time of injection molding cycle was 1 to 1.5 minutes. Clear, solid, smooth and glossy test bars having very good mechanical properties were thus obtained.

EXAMPLE 9

A strip of the above-described IP 181 glass fiber textile was impregnated with a 34.2% aqueous solution of gelatin by slowly passing it through the solution in an immersion tank. After air-drying, it was again passed through the gelatin solution. Upon air-drying, it was found to contain 33.2% based on the total weight of the strip, of gelatin having a 13% moisture content. The dried strip was then cut into 5.5″ x 5.5″ panels and a lay-up of fourteen of the panels was made up. It weighed 3.78 grams per square inch. After covering the top and bottom with cellophane and a polished metal caul plate, the lay-up was inserted into a press and molded for one hour at a temperature of 102° C. to 113° C. and a molding pressure of 20 to 100 p.s.i. for 55 minutes and at 113–15° C. and 200 p.s.i. for another 55 minutes. The platen temperature was then lowered with cold water to 80–90° C., and the laminate was removed from the press and transferred immediately to a 130° C. oven for overnight cure. The cured laminate had a weight of 3.73 grams per square inch. It was found to have a flexural strength of 500,200 p.s.i., and an elastic modulus of 504,000 p.s.i. as determined by U.S. Federal Specification LP 406B—Method 1031-1.

EXAMPLE 10

Fourteen 6″ x 8″ rectangles of the glass fiber cloth of Example 9 were saturated with water by immersion and then allowed to dry to approximately 20% water content. One surface of each was then uniformly coated with powdered gelatin, and the coated textile was formed into a 14-ply sandwich. For each ply there was used 5.4 g. of powdered gelatin, the total amount (75 g.) of gelatin which was employed being calculated to give in the 14-ply lay-up a 35% by weight content of gelatin which contained 13% by weight of water. After stacking, a sheet of cellophane was placed at the top and bottom of the stack, and the resulting lay-up was pressed in a steam-heated hydraulic press at a bottom platen temperature of 101–102° C./20 p.s.i. for 20 minutes, 104–105° C./30 p.s.i. for 30 minutes, and 114–117° C./200 p.s.i. for about 3 hours. The laminate thus obtained was smooth, glossy and well-bonded. Analysis after molding showed it to contain approximately 19% of water, as compared to the approximately 5% water content of laminates prepared from glass fiber cloth which had been immersed in aqueous solution of gelatin and dried. The comparatively high water content of the present laminate probably accounts for the longer press time which was required.

EXAMPLE 11

In this example, the effect of moisture content in the preparation of glass fiber cloth laminates was investigated.

The glass fiber cloth of Example 9 was impregnated by dipping into an aqueous solution of gelatin and air dried to give a sample of impregnated and air-dried fabric having 39.6% by weight of gelatin containing 13% by weight of water, based on the weight of the gelatin. The sample was then kept in a desiccator for about a week; at the end of that time the water content had been reduced to 10.7%. It could not be laminated and was labeled Sample 21.

In another experiment, glass fiber cloth was impregnated and air dried to give a fabric having a 33.7% by weight content of gelatin containing 13% by weight of water. The fabric was then oven-dried for 2 hours at 105° C. and for 2 hours at 120° C. to reduce the water content to 11.7%. Attempts to laminate the resulting fabric were unsuccessful. It was then labeled Sample 27.

Sample 21, which had contained 10.7% of water previous to attempts at lamination, was then stored overnight in a 100% relative humidity box. Thereby, the moisture content of the sample was increased to 14%. It was readily molded to form a tough coherent laminate.

Sample 27, which had contained 11.7% of moisture previous to attempts at lamination, was immersed briefly into water and then allowed to air-dry overnight. At the end of that time it had a moisture content of 15.6%. It was then readily pressed into a laminate having a flexural strength of 63,000 p.s.i. as determined by the procedure used in Example 9.

This shows that when the water content of the gelatin drops below 12%, there is no gelatin flow and no lamination, and that upon reintroduction of water into the dried gelatin to increase the moisture content to above the 12% level, pressing gives good laminates.

EXAMPLE 12

This example shows the effect of heat-curing, subsequent to compression molding at a temperature of below 120° C.

A strip of IP 181 glass fiber cloth was passed through the triple rolls of an immersion tank containing 34.2% of an aqueous solution of gelatin. After air-drying for about two hours it was found to have a 24.9% weight content of gelatin containing about 13% of water, or a 21.7% content of gelatin mminus the water. The strip was cut into 5.5″ x 5.5″ panels and the panels were arranged into a 14-layer assembly which weighed 104.8 g. (3.51 g./sq.-in.). After covering the top and bottom with a sheet of cellophane, the assembly was pressed at 99° C. and less than 10 p.s.i. for about 20 minutes, at 99–108° C. and 30 to 100 p.s.i. for about 35 minutes and at 115–118° C. and 200 p.s.i. for about another 55 minutes. After removing the resulting laminate from the press, it was allowed to cool and a 1″ x 5″ test specimen was cut from the laminate. It was found to have a flexural strength of 35,000 p.s.i. and a modulus of elasticity of 487,000 p.s.i. The remainder of the laminate was cured overnight at 120° C. After curing, a specimen was cut therefrom. It was found to have a flexural strength of 43,200 p.s.i. and a modulus of elasticity of 523,000 p.s.i., as determined by the testing procedures of Example 9.

EXAMPLE 13

This example shows the preparation of tough laminates using various quantities of gelatin and diverse press cycles.

Glass fiber fabric (IP–181), which had been impregnated with gelatin from an aqueous solution and then dried to a 38% by weight content of gelatin containing 13% of water based on the weight of the gelatin, was stacked into 14 plies. It was molded by heating at 102° C. for 20 minutes and then pressing, first at 105° C. and 100 p.s.i. for 30 minutes, and finally at 135° C. and 200 p.s.i. for 60 minutes. There was thus obtained a laminate having a flexural strength of 67,200 p.s.i. as determined by the testing procedure of Example 9.

In another experiment the same glass fiber fabric, but containing 37.1% by weight of a gelatin having a 13% moisture content based on the weight of the gelatin was stacked into 14 plies, and the assembly was heated for 20 minutes at 102° C., and then pressed at 105° C. and 100 p.s.i. for 30 minutes and 135° C. and 2000 p.s.i. for 60 minutes. The laminate thus obtained had a flexural strength of 77,900 p.s.i., as determined by the same method.

In still another experiment, the same glass fiber fabric, but containing 49.5% by weight of gelatin having a 13% moisture content based on the weight of the gelatin, was stacked into 14 plies, heated for 20 minutes at 102° C. and then pressed at 105° C. and 100 p.s.i. for 50 minutes and at 135° C. and 1000 p.s.i. for 60 minutes. The laminates thus obtained had a flexural strength of 69,600 p.s.i. as determined by the same method.

EXAMPLE 14

Glass fiber cloth, which had been impregnated with gelatin to a 27.3% by weight content of gelatin containing about 13% of water based on the weight of the gelatin, was stacked into a 14 ply sandwich, and the resulting assembly was placed on platens which had been heated to 130–135° C. (40 pounds of steam). After 3 minutes, 200 p.s.i. of pressure was applied at 135° C. for 10 minutes and the platens were opened briefly. Pressing at 130–135° C./200 p.s.i. was continued for another 20 minutes, during which time the platens were opened and closed a few times. The laminate was then removed from the press and placed in an oven at 130° C. where it was cured for 24 hours.

In order to determine the effect of the pressing and curing upon gelatin content, a 1″ square specimen was cut from the laminate, weighed, and ignited for determination of gelatin content by loss upon ignition. The percent weight gelatin in the finished laminate was thus found to be substantially the same as that of the dried, impregnated cloth prior to lamination.

EXAMPLE 15

Glass fiber cloth containing approximately 1% of water was drawn through a bath kept at 50–60° C. and consisting of a 19.6% aqueous solution of gelatin. It was then air-dried at ambient temperature for 2 hours and subsequently stored for 40 days in a 52% relative humidity cabinet. The cloth, having a 16.2% by weight content of gelatin containing approximately 13% water, was then cut into 5″ x 5.5″ rectangles, and 14 of these were stacked. A sheet of cellophane was placed at the top and bottom of the stack and the assembly was placed on the platens of a steam-heated press set at 125° C. After 2 minutes, when the temperature of the laminate was 115° C., a pressure of 200 p.s.i. was applied and maintained for 10 minutes, during which time the temperature of the laminate reached 125° C. The press was then opened for observation. The laminate was warped and blistering was noted. After another 10 minutes at 125° C./200 p.s.i., the laminate was removed from the press. The laminate was no longer warped and blistering had disappeared. The flat, well-bonded laminate thus obtained was allowed to cool to room temperature and it was then submitted to a curing process which consisted of heating it for 24 hours at 130–135° C. A test specimen cut from the cured laminate was found to have a flexural strength of 35,800 p.s.i. and an elastic modulus of 503,000 p.s.i. when tested by the procedure of Example 9.

EXAMPLE 16

Glass fiber cloth (IP 181) was impregnated by dipping it into a 25% aqueous solution of gelatin, air-dried, and brought to a 36.8% by weight content of gelatin having about 13% moisture by maintaining the treated cloth in a constant temperature room at 70° F. and a relative humidity of 50%. The impregnated material was then assembled into a 14-ply 5.5″ x 5.5″ unit which weighed 129.4 g., and pressed at a cycle of 20 minutes/102° C., 30 minutes/105° C., and 90 minutes/115° C., with mold pressures of 100 p.s.i. and 200 p.s.i. for the 105° C. and 115° C. temperatures, respectively. There was thus obtained a laminate having a flexural strength of 56,000 p.s.i., as determined by the procedure of Example 1. The laminate was rapidly attacked by boiling water, and water-resistance, generally, of this laminate was inferior to that of laminates prepared by molding at temperatures of 125–135° C.

EXAMPLE 17

Glass fiber cloth was impregnated with gelatin by drawing it through a bath consisting of a 25% aqueous solution of gelatin at the rate of 2 feet/minute while maintaining the bath temperature at 60° C. After air-drying it was determined to have a 33.1% content of gelatin having about 20% by weight of moisture. It was then cut into 5.5″ x 5.5″ squares and twelve of these were sandwiched together for pressing to a laminate. Using a press cycle of 30 minutes at 105° C. at platen pressure, and 60 minutes at 135° C./2000 p.s.i. mold pressure, there was observed some escape of gelatin. This, of course, reduced the gelatin content. However, there was obtained a smooth, coherent laminate having a flexural strength of 54,400 p.s.i. as determined by the Example 9 testing procedure.

EXAMPLE 18

Using the procedure described in Example 17, glass fiber cloth was passed through acqueous gelatin. It was then dried for 18 hours at 110° C. In order to confer sufficient moisture for laminating, the dried cloth was then immersed in water and allowed to air dry at ambient tempeature to a moisture content of about 13%, based on the weight of the gelatin content of the cloth. It was then stacked and pressed into a laminate as described in Example 17 to give a laminate having a flexural strength of 57,500 p.s.i. as determined by the test method used in Example 17. This shows that rapid, extreme drying of the cloth after treating with the gelatin solution does not adversely affect the strength of the laminate obtained therefrom, so long as subsequent to the drying, moisture is reintroduced into the gelatin in the concentration of at least 12%.

EXAMPLE 19

A 14-ply assembly was made of glass fiber textile containing, by impregnation, 32.4% of gelatin on a dry basis, the gelatin content having been determined by igniting a portion of the textile. The moisture content of the gelatin was 13% by weight of the gelatin, as determined by loss in weight previous to combustion. Press platens were preheated to 100–105° C. and the assembly, containing an imbedded thermocouple was inserted into the steam press at platen pressure only. Molding was conducted at less than 20 p.s.i. for 10 minutes, at 104–105° C. and 100 p.s.i. for ten minutes, and at 125–127° C. for another ten minutes. The press was then opened for inspection of the laminate. It was glossy, and soft and pliable, although a few blisters were evident. It was then again placed in the press at 200 p.s.i., and maintained at this pressure and at a temperature of about 112° C. for about 140 minutes. The press was then opened, and the laminate was transferred to an oven to cure overnight at 120° C. When placed in the oven, the laminate was flat and glossy and contained no blisters. It was hard and tough. After curing, a test specimen cut from the cured laminate was found to have a flexural strength of 49,200 p.s.i. and an elasticity modulus of 493,000 p.s.i. as determined by the test procedure of Example 9. Another test specimen cut from the cured laminate was dried overnight at 100–110° C., cooled in a desiccator, weighed, and ignited at 1200° F. The gelatin content of the molded and cured laminate was not less than that of the impregnated glass fiber textile previous to the molding.

EXAMPLE 20

This example shows the effect of polyacrylic acid as a cross-linking agent for gelatin in the preparation of a fiber glass laminate.

An aqueous solution of polyacrylic acid containing 75% solids was respectively added to a 25% aqueous solution of gelatin in a quantity calculated to give respectively (1) a 10% by weight content of the polyacrylic acid based on the weight of the gelatin, and (2) a 2.5% by weight content of polyacrylic acid based on the weight of the gelatin. The resulting milk-white mixtures were then used as baths for impregnation of glass fiber textile by respectively passing a strip of the textile over rollers within the bath at a rate of 2 feet per minute while maintaining the bath at 60° C. The treated strips were weighed, air-dried and then kept in a constant temperature room at 70° F. and 50% relative humidity to give a 13% moisture content in the gelatin. They were then cut into 5.5″ x 5.5″ pieces and 14 of them from each bath treatment were assembled to form laminate structures, each structure being composed of pieces from the same bath treatment. The structures were pressed at a cycle of 30 minutes at platen pressure and 105° C., and 60 minutes at 2000 p.s.i. and 135° C. The pressed laminates thus obtained were glossy, smooth and hard-bonded. Laminate (I), obtained from the textile treated with the solution containing 2.5% polyacrylic acid had a flexural strength of 45,000 p.s.i. and Laminate (II) obtained from the solution which contained 10% of polyacrylic acid had a flexural strength of 46,200 p.s.i. Both laminates were submitted to tests for moisture resistance. Immersion in water at room temperature in 24 hour and 48 hour tests gave a weight increase of 63% and 71% for Laminate (I) and 61% and 75% for Laminate (II). Upon immersion in boiling water for 2 hours, Laminate (II) showed a weight increase of 31%, without administration.

While specific examples of preferred methods embodying the present invention have been set forth above, it will be understood that many changes and modifications may be made in the procedures and composites without departing from the spirit of the invention, which is limited only by the appended claims.

What is claimed is:

1. The method which comprises molding a mixture of chemically unreacted gelatin having a water content of from 12% to 40% by weight, and a halogen-free polyfunctional organic polymer at a temperature of from 100° C. to 160° C. and a pressure of from 50 p.s.i. to 3000 p.s.i., to obtain a tough, solid material of construction.

2. The method which comprises molding a mixture of chemically unreacted gelatin having a water content of from 12% to 40% by weight, and polyacrylic acid at a temperature of from 100° C. to 160° C. and a pressure of from 50 p.s.i. to 3000 p.s.i., to obtain a tough, solid material of construction.

3. The method of forming a structural unit which comprises impregnating a permeable support with an aqueous solution of chemically unreacted gelatin and halogen-free polyfunctional organic polymer to give a deposit of gelatin and said polymer equal to at least about 10% by weight, on an anhydrous basis, of the weight of the impregnated support, drying and conditioning the impregnated support to give a moisture content of from 12% to 40% in the deposit of gelatin, stacking the conditioned substrate, and molding the stack at a temperature of from 100° C. to 160° C., and a pressure of from 50 to 3000 p.s.i. to obtain a laminate.

References Cited

UNITED STATES PATENTS

| | | | |
|---|---|---|---|
| 317,390 | 5/1885 | Lockwood et al. | 260—117 |
| 1,394,746 | 10/1921 | Leroy et al. | 264—160 |
| 1,770,573 | 7/1930 | Haavardsholm | 99—130 XR |
| 1,842,544 | 1/1932 | Freuder | 156—336 |
| 2,124,767 | 7/1938 | Dawn | 106—136 |
| 2,477,407 | 7/1949 | Grant et al. | 161—197 |
| 3,257,208 | 6/1966 | VanPaesschen | 260—8 |
| 1,613,362 | 1/1927 | Sheppard et al. | 260—117 |

EARL M. BERGERT, *Primary Examiner.*

D. J. FRITSCH, *Assistant Examiner.*